(12) United States Patent
Chen et al.

(10) Patent No.: US 10,752,749 B2
(45) Date of Patent: Aug. 25, 2020

(54) METHODS AND COMPOSITIONS FOR INCREASING INK CLAY LOADING IN HEATSET INK FORMULATIONS WHILE MAINTAINING INK GLOSS, AND INK FORMULATIONS PRODUCED THEREFROM

(71) Applicant: KaMin LLC, Macon, GA (US)

(72) Inventors: Ching Yih Chen, Macon, GA (US); Richard Douglas Carter, Macon, GA (US); Brent Ashley Nobles, Warner Robins, GA (US)

(73) Assignee: KAMIN LLC, Macon, GA (US)

( * ) Notice: Subject to any disclaimer, the term of this patent is extended or adjusted under 35 U.S.C. 154(b) by 16 days.

(21) Appl. No.: 15/913,798

(22) Filed: Mar. 6, 2018

(65) Prior Publication Data

US 2018/0194923 A1   Jul. 12, 2018

Related U.S. Application Data

(63) Continuation of application No. 14/402,533, filed as application No. PCT/US2013/041953 on May 21, 2013, now abandoned.
(Continued)

(51) Int. Cl.
*C09D 11/00* (2014.01)
*C08K 3/34* (2006.01)
(Continued)

(52) U.S. Cl.
CPC ............... *C08K 3/346* (2013.01); *C08K 5/09* (2013.01); *C08K 5/17* (2013.01); *C08K 5/5403* (2013.01);
(Continued)

(58) Field of Classification Search
CPC ...... C08K 3/346; C08K 9/04; C08K 2201/003
See application file for complete search history.

(56) References Cited

U.S. PATENT DOCUMENTS

RE30,450 E   12/1980  Iannicelli
5,137,568 A *  8/1992  Durham ............... C01B 33/44
                                              106/31.75
(Continued)

FOREIGN PATENT DOCUMENTS

FR       1499348       10/1967
JP    2009-249430      10/2009
(Continued)

OTHER PUBLICATIONS

Japanese Patent Application No. 2015-515044 Office Action dated Dec. 6, 2016 with an English translation.
(Continued)

*Primary Examiner* — Vu A Nguyen
(74) *Attorney, Agent, or Firm* — Hamre, Schumann, Mueller & Larson, P.C.

(57) ABSTRACT

In some variations, this disclosure provides a surface-modified hydrophobic clay composition for an ink formulation, the composition comprising up to 99 wt % clay particles with a particle-size distribution characterized in that at least 10% are smaller than 0.2 microns, at least 25% are smaller than 0.5 microns, and at least 95% are less than 5 microns; and from about 1 wt % to about 10 wt % of one or more organic compounds selected from quaternary ammonium compounds, organic acids, fatty acids, organic silanes, or organic polysilanes. The surface-modified hydrophobic clay composition may be produced by various methods, including a slurry method or a dry-mixing method. Ink clay loadings in heatset ink formulations may be increased to 10-15% without losing ink gloss. Inks may be produced with
(Continued)

lower solvent, resin, and/or pigment concentrations, thereby reducing cost.

19 Claims, 8 Drawing Sheets

Related U.S. Application Data

(60) Provisional application No. 61/652,955, filed on May 30, 2012.

(51) Int. Cl.
    *C08K 9/04*     (2006.01)
    *C08K 5/09*     (2006.01)
    *C08K 5/17*     (2006.01)
    *C09D 11/037*     (2014.01)
    *C09D 11/101*     (2014.01)
    *C08K 5/54*     (2006.01)
    *C09D 11/10*     (2014.01)

(52) U.S. Cl.
    CPC .............. *C08K 9/04* (2013.01); *C09D 11/037* (2013.01); *C09D 11/10* (2013.01); *C09D 11/101* (2013.01)

(56) References Cited

U.S. PATENT DOCUMENTS

| | | |
|---|---|---|
| 5,358,562 A | 10/1994 | Nae et al. |
| 2006/0047047 A1* | 3/2006 | Patel ................. B82Y 30/00 524/447 |
| 2007/0010600 A1 | 1/2007 | Goodman et al. |
| 2007/0107635 A1 | 5/2007 | Soane et al. |
| 2007/0125266 A1 | 6/2007 | Ito |
| 2009/0169890 A1 | 7/2009 | Pruett et al. |
| 2010/0003409 A1* | 1/2010 | Rao ..................... C09D 11/328 427/288 |
| 2010/0026773 A1 | 2/2010 | Schultz et al. |
| 2010/0215972 A1 | 8/2010 | Malla et al. |

FOREIGN PATENT DOCUMENTS

| | | |
|---|---|---|
| KR | 2003-0095143 | 12/2003 |
| WO | WO2010/098821 | 9/2010 |

OTHER PUBLICATIONS

Zhang et al. "Nonaqueous Suspensions of Surface-Modified Kaolin" Langmuir 9online), Feb. 17, 2007, vol. 23, Iss. 6, pp. 3424-3431.
Supplementary European Search Report for European application No. 13797724 dated Mar. 18, 2016.
Korean Office Action with English translation dated Nov. 29, 2019 for Korean application No. 10-2014-7036922.

* cited by examiner

| NPIRI | Lithosperse | Lithosperse Nextgen | ASP101 | Socal | Neolight200 | Neolight 300 |
|---|---|---|---|---|---|---|
| Scratches | No | No | No | No | No | No |
| Speckle | Light | Light | Light | Heavy | Heavy | Heavy |
| Break Point | No | 10 | 15 | No | No | No |
| 10 Min. Duke Test | | | | | | |
| % Water Pickup | 46.0 | 44.9 | 48.5 | 49.4 | 53.4 | 52.9 |
| Bleed to F.S | 0 | 0 | 0 | 0 | 0 | 0 |

METHODS AND COMPOSITIONS FOR INCREASING INK CLAY LOADING IN HEATSET INK FORMULATIONS WHILE MAINTAINING INK GLOSS, AND INK FORMULATIONS PRODUCED THEREFROM

PRIORITY DATA

This application is a continuation application of U.S. patent application Ser. No. 14/402,533 filed on Nov. 20, 2014 which is a 371 of international patent application PCT/US2013/41953 filed on May 21, 2013 which claims priority to U.S. Patent App. No. 61/652,955, filed May 30, 2012 for METHODS AND COMPOSITIONS FOR INCREASING INK CLAY LOADING IN HEATSET INK FORMULATIONS WHILE MAINTAINING INK GLOSS, AND INK FORMULATIONS PRODUCED THEREFROM, which is hereby incorporated by reference herein.

FIELD

This disclosure relates to ink formulations (such as heatset ink formulations), as well as methods of making inks that incorporate increased clay loadings while maintaining desired physical and chemical properties.

BACKGROUND

Printing ink is a complex mixture of ingredients that are combined in a specific formulation to meet desired characteristics of the printing application of the ink. It is well-known that printing inks utilized today are typically modified with various types of additives to provide required rheological properties to ensure quality printing on high-speed printing presses. Generally, polymer (or resin), solvent, and pigment types determine the intrinsic rheology of the ink formulation. It has been known that clays can be used to control rheology and reduce ink misting on high-speed presses.

Offset color ink is generally formulated with various amounts of an extender pigment to achieve the rheological requirements of the process. Clays are often used for this purpose since they are low in cost and have the ability of decreasing the misting and slinging of the inks when printed at high speeds. The amount of clay used in such applications varies from about 2-10 wt % for letter press color inks and from 10-25 wt % for web offset color inks. Heatset ink formulations presently can include up to about 5 wt % clays, but at higher loadings there is a negative impact on ink gloss.

The incorporation of clay into the manufacture of inks and the larger content of clay required in web offset inks cause two basic problems. First, the clay presents difficulty in dispersing itself in the ink if the ink is manufactured using high-speed mixing without roller milling. However, clays have a hydrophilic surface and consequently are very difficult to be wetted and dispersed by hydrocarbons such as mineral oils and varnishes. In addition, dispersions of conventional clays and hydrocarbons are not very stable on aging, and some agglomeration of clay particles occurs.

The second problem occurs during printing of lithographic inks (offset inks) whereby the clay in the ink is leached by the fountain solution and slowly migrates in it. The hydrophilicity of the clays is such that the clay is extracted from the ink and begins to dissolve into the water together with traces of color pigments. This causes a bleeding problem. In addition, the presence of clay in the fountain solution causes a variety of printability problems resulting in inadequate reproduction of colors.

There is a commercial need for modified clays to increase viscosity and maintain gloss in lithographic inks, where the clays wet easily with hydrocarbon solvents and do not leach by the fountain solutions. What is particularly needed is a surface-enhanced clay for use in heatset and sheet-fed inks. It is desired to replace ink resin and ink oil with minimal impact on key ink properties such as ink gloss and ink densities, with little or no ink bleeding to fountain solution even at high ink clay loadings.

SUMMARY OF THE DISCLOSURE

It has been surprisingly discovered that ink clay loadings in heatset ink formulations may be increased from 3-5% to 10-15% without losing ink gloss, by incorporating certain treatments to the clay particles, as disclosed herein. In particular, fine clay particles may be treated with quaternary ammonium compounds. The quaternary ammonium compounds react with the clay, such as by electrostatic bonding. The clay particles transition from hydrophilic to hydrophobic. The result is to engender or enhance a glossing effect, extend the resin in the composition (allowing to reduce the amount of resin), and lower overall cost.

Methods, processes, and systems will first be summarized, followed by compositions and formulations. This disclosure includes modified clays for ink formulations produced by any of the disclosed methods, as well as ink formulations produced by any of the disclosed processes.

In some variations, a method of producing a surface-modified clay for an ink formulation comprises:

(a) providing clay particles with a particle-size distribution characterized in that at least 40% of the clay particles are smaller than 0.2 microns, at least 70% of the clay particles are smaller than 0.5 microns, and substantially all of the clay particles are less than 5 microns;

(b) forming a slurry comprising the clay particles in water, wherein the slurry contains a solids content of from about 20 wt % to about 25 wt %;

(c) introducing the slurry to a reactor, operated under effective treatment conditions and in the presence of an organic compound to modify a surface of the clay particles, wherein the effective treatment conditions include a treatment temperature selected from about 65° C. to about 72° C., a treatment time selected from about 20 minutes to about 40 minutes, and moderate mixing of the contents of the reactor, to form a treated clay slurry; and (d) conveying the treated clay slurry to a dryer to produce a product comprising a surface-modified clay.

The organic compound may be selected, for example, from quaternary ammonium compounds, organic acids (including, but not limited to, saturated or unsaturated fatty acids having at least four carbon atoms, such as stearic acid), organic silanes, organic polysilanes, or any mixtures thereof.

In some variations, a method of producing a surface-modified clay for an ink formulation comprises:

(a) providing clay particles with a particle-size distribution characterized in that at least 40% of the clay particles are smaller than 0.2 microns, at least 70% of the clay particles are smaller than 0.5 microns, and substantially all of the clay particles are less than 5 microns;

(b) forming a slurry comprising the clay particles in water, wherein the slurry contains a solids content of from about 20 wt % to about 25 wt %;

(c) introducing the slurry to a reactor, operated under effective treatment conditions and in the presence of a quaternary ammonium compound, to modify a surface of the clay particles, wherein the effective treatment conditions include a treatment temperature selected from about 65° C. to about 72° C., a treatment time selected from about 20 minutes to about 40 minutes, and moderate mixing of the contents of the reactor, to form a treated clay slurry; and (d) conveying the treated clay slurry to a dryer to produce a product comprising a surface-modified clay, wherein the quaternary ammonium compound is given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, at least 50% or at least 60% of the clay particles are smaller than 0.2 microns. In some embodiments, at least 80% or at least 95% of the clay particles are smaller than 0.5 microns. In some embodiments, substantially all of the clay particles are less than 2 microns, 3 microns, or 4 microns.

The clay particles may comprise one or more clays selected from the Kaolin group of minerals comprising kaolinite, dickite, halloysite, nacrite, montmorrilite, or any other polymorph of $Al_2Si_2O_5(OH)_4$. In some embodiments, the clay particles are kaolin clay particles.

The quaternary ammonium compound may vary widely. In some embodiments, at least one or two of $R_1$, $R_2$, $R_3$, and $R_4$ is selected from $C_{10}$-$C_{24}$ chains. In some embodiments, at least one or two of $R_1$, $R_2$, $R_3$, and $R_4$ is selected from $C_1$-$C_9$ chains. For example, at least one or two of $R_1$, $R_2$, $R_3$, and $R_4$ may be a methyl group. In certain embodiments, two of $R_1$, $R_2$, $R_3$, and $R_4$ are methyl groups and the other two are selected from $C_{16}$-$C_{18}$ chains. The X group or element may be is an organic anion or an inorganic anion, such as chloride ($Cl^-$) or another halide anion.

The quaternary ammonium compound may be present in a concentration of at least about 1 wt % of the mass of the clay particles in the reactor. In some embodiments, the quaternary ammonium compound is present in a concentration of at least about 2 wt %, 2.5 wt %, 3 wt %, 3.5 wt %, 4 wt %, 5 wt % or more of the mass of the clay particles in the reactor.

The dryer may be a spray dryer coupled with a heated air chamber. Or, the dryer may be a flash dryer that simultaneously mixes and dries the treated clay slurry in a heated air chamber.

The method may be conducted continuously, semi-continuously, or in a batch process. For example, the treatment reactor may be continuous. In some embodiments, each of steps (a)-(d) is continuous.

Following treatment the surface-modified clay is hydrophobic, or at least more hydrophobic than the starting (unmodified) clay. Optionally, the method may include grinding the product to reduce the density of the surface-modified clay, such as in a grinding mill or other suitable apparatus.

In some embodiments, a method of producing a surface-modified clay for an ink formulation comprises:

(a) providing clay particles with a particle-size distribution characterized in that at least 10% of the clay particles are smaller than 0.2 microns, at least 25% of the clay particles are smaller than 0.5 microns, and at least 95% of the clay particles are less than 5 microns;

(b) forming a slurry comprising the clay particles in water;

(c) introducing the slurry to a reactor, operated under effective treatment conditions and in the presence of a quaternary ammonium compound to modify a surface of the clay particles, to form a treated clay slurry; and (d) conveying the treated clay slurry to a dryer to produce a product comprising a surface-modified clay, wherein the quaternary ammonium compound is given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, a method of producing a surface-modified clay for an ink formulation comprises:

(a) providing clay particles with a particle-size distribution characterized in that at least 10% of the clay particles are smaller than 0.2 microns, at least 25% of the clay particles are smaller than 0.5 microns, and at least 95% of the clay particles are less than 5 microns;

(b) forming a slurry comprising the clay particles in water;

(c) introducing the slurry to a reactor, operated under effective treatment conditions and in the presence of an organic compound to modify a surface of the clay particles, to form a treated clay slurry; and (d) conveying the treated clay slurry to a dryer to produce a product comprising a surface-modified clay.

In some embodiments, a method of producing a surface-modified clay for an ink formulation comprises:

(a) providing clay particles with a particle-size distribution characterized in that at least 10% of the clay particles are smaller than 0.2 microns, at least 25% of the clay particles are smaller than 0.5 microns, and at least 95% of the clay particles are less than 5 microns; and (b) mixing the clay particles with an organic compound in a treatment unit to modify a surface of the clay particles, to produce a product comprising a surface-modified clay.

This disclosure also provides systems and apparatus for producing surface-modified clay for an ink formulation. Some embodiments provide a system for modifying clay particles for an ink formulation, comprising:

(a) a slurry vessel for forming a slurry comprising fine clay particles in water;

(b) a reactor, in operable communication with the slurry vessel, for receiving the slurry and a quaternary ammonium compound, wherein the reactor is configured with heating means and mixing means to modify a surface of the fine clay particles, to form a treated clay slurry;

(c) a dryer, in operable communication with the reactor, for receiving the treated clay slurry, wherein the dryer is configured to remove water from the treated clay slurry to form a surface-modified clay; and (d) optionally a grinding mill, in operable communication with the dryer, for reducing particle size of the surface-modified clay.

In some embodiments, the system is continuous. In other embodiments, the system is configured for a batch process.

In some embodiments, the dryer is a spray dryer coupled with a heated air chamber. In some embodiments, the dryer is a flash dryer that simultaneously mixes and dries the treated clay slurry in a heated air chamber.

In other variations, a system for modifying clay particles for an ink formulation comprises a treatment unit for modifying fine clay particles in the presence of an organic compound; and optionally further comprises a grinding mill, in operable communication with the treatment unit, for reducing particle size of the surface-modified clay.

Other variations provide a process to produce a heatset ink formulation, the process comprising:

(a) providing clay particles with a particle-size distribution characterized in that at least 10% of the clay particles are smaller than 0.2 microns, at least 25% of the clay particles are smaller than 0.5 microns, and at least 95% of the clay particles are less than 5 microns;

(b) forming a slurry comprising the clay particles in water;

(c) introducing the slurry to a reactor, operated under effective treatment conditions and in the presence of a quaternary ammonium compound to modify a surface of the clay particles, to form a treated clay slurry, wherein the quaternary ammonium compound is given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion;

(d) conveying the treated clay slurry to a dryer to produce a product comprising a surface-modified clay;

(e) combining the surface-modified clay with an organic solvent, a resin, and a pigment or dye to form a heatset ink formulation.

Certain variations provide a process to produce a heatset ink formulation, the process comprising:

(a) providing clay particles with a particle-size distribution characterized in that at least 40% of the clay particles are smaller than 0.2 microns, at least 70% of the clay particles are smaller than 0.5 microns, and substantially all of the clay particles are less than 5 microns;

(b) forming a slurry comprising the clay particles in water, wherein the slurry contains a solids content of from about 20 wt % to about 25 wt %;

(c) introducing the slurry to a reactor, operated under effective treatment conditions and in the presence of a quaternary ammonium compound, to modify a surface of the clay particles, wherein the effective treatment conditions include a treatment temperature selected from about 65° C. to about 72° C., a treatment time selected from about 20 minutes to about 40 minutes, and moderate mixing of the contents of the reactor, to form a treated clay slurry, wherein the quaternary ammonium compound is given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion;

(d) conveying the treated clay slurry to a dryer to produce a product comprising a surface-modified clay; and (e) combining the surface-modified clay with an organic solvent, a resin, and a pigment or dye to form a heatset ink formulation.

This disclosure also provides compositions for inks.

A surface-modified hydrophobic clay composition for an ink formulation comprises, in some embodiments:

(i) up to 99 wt % clay particles with a particle-size distribution characterized in that at least 40% of the clay particles are smaller than 0.2 microns, at least 70% of the clay particles are smaller than 0.5 microns, and substantially all of the clay particles are less than 5 microns; and (ii) from about 1 wt % to about 10 wt %, such as from about 2 wt % to about 8 wt % pr about 2 wt % to about 5 wt %, of one or more organic compounds selected from the group consisting of a quaternary ammonium compound, an organic acid, a fatty acid, an organic silane, an organic polysilane, and combinations thereof.

In some embodiments, a surface-modified hydrophobic clay composition for an ink formulation comprises:

(i) up to 99 wt % clay particles with a particle-size distribution characterized in that at least 40% of the clay particles are smaller than 0.2 microns, at least 70% of the clay particles are smaller than 0.5 microns, and substantially all of the clay particles are less than 5 microns; and (ii) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, the composition includes from about 2 wt % to about 4 wt % of the one or more quaternary ammonium compounds. Some water may also be present, such as up to about 2 wt % $H_2O$.

In some embodiments, at least 50% or at least 60% of the clay particles are smaller than 0.2 microns. In these or other embodiments, at least 80% or at least 95% of the clay particles are smaller than 0.5 microns. In these or still other embodiments, substantially all of the clay particles are less than 2 microns, 3 microns, or 4 microns.

The clay particles preferably include one or more clays selected from the Kaolin group of minerals comprising kaolinite, dickite, halloysite, nacrite, montmorrilite, or any other polymorph of $Al_2Si_2O_5(OH)_4$. The clay particles are kaolin clay particles, in certain embodiments.

At least one (such as one, two, or three) of $R_1$, $R_2$, $R_3$, and $R_4$ is selected from $C_{10}$-$C_{24}$ chains, in some embodiments. At least one (such as one, two, or three) of $R_1$, $R_2$, $R_3$, and $R_4$ is selected from $C_1$-$C_9$ chains, such as methyl ($—CH_3$), in some embodiments. In certain embodiments, two of $R_1$, $R_2$, $R_3$, and $R_4$ are methyl groups and the other two of $R_1$, $R_2$, $R_3$, and $R_4$ are selected from $C_{16}$-$C_{18}$ chains. The monovalent anion X may be organic or inorganic, but is preferably inorganic such as $Cl^-$ or $Br^-$.

Other variations provide a heatset ink formulation comprising:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more organic compounds selected from the group consisting of a quaternary ammonium compound, an organic acid, a fatty acid, an organic silane, an organic polysilane, and combinations thereof.

The resin may be present at about 25-35 wt % or less in the heatset ink formulation. The clay particles may be present at about 5-15 wt % or more in the heatset ink formulation.

Still other variations provide a heatset ink formulation comprising:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, the resin is present at about 35 wt % or less in the heatset ink formulation, such as about 30 wt %, 25 wt %, or less in the heatset ink formulation.

In some embodiments, the clay particles are present at about 5 wt % or more in the heatset ink formulation, such as about 10 wt %, about 15 wt %, or more in the heatset ink formulation.

Many other variations are possible. For example, a UV-curable ink formulation is provided, comprising:
(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

A UV-curable ink formulation as disclosed may comprise:
(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more organic compounds selected from the group consisting of a quaternary ammonium compound, an organic acid, a fatty acid, an organic silane, an organic polysilane, and combinations thereof.

DETAILED DESCRIPTION OF SOME EMBODIMENTS

This description will enable one skilled in the art to make and use the principles of the disclosure, and it describes several embodiments, adaptations, variations, alternatives, and uses of the disclosure.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. As used herein, a "composition," "blend," "compound," or "mixture" are all intended to be used interchangeably.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Unless otherwise indicated, all numbers expressing parameters, conditions, concentrations, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The examples described herein are examples of the disclosure, including examples of various embodiments as well as comparative examples. None of the examples should be construed as limiting the principles of the invention, or its application, in any way. All examples are exemplary only.

Some embodiments are premised on the discovery that ink clay loadings in heatset ink formulations may be increased from 3-5% to 10-15% without losing ink gloss, by incorporating certain treatments to the clay particles. In particular, fine clay particles may be treated with organic compounds, such as (but not limited to) quaternary ammonium compounds. The organic compounds react with the clay, such as by electrostatic bonding. The clay particles transition from hydrophilic to hydrophobic. The result is to engender or enhance a glossing effect, extend the resin in the composition (allowing to reduce the amount of resin), and lower overall cost.

In some embodiments, the invention provides a method of producing a surface-modified clay for an ink formulation, the method comprising:
(a) providing clay particles with a particle-size distribution characterized in that at least 10% of the clay particles are smaller than 0.2 microns, at least 25% of the clay particles are smaller than 0.5 microns, and at least 95% of the clay particles are less than 5 microns;
(b) forming a slurry comprising the clay particles in water;
(c) introducing the slurry to a reactor, operated under effective treatment conditions and in the presence of an organic compound to modify a surface of the clay particles, to form a treated clay slurry; and
(d) conveying the treated clay slurry to a dryer to produce a product comprising a surface-modified clay.

The fine clay particles are treated with one or more organic compounds to modify the surface and make them hydrophobic. The organic compound may be selected from the group consisting of a quaternary ammonium compound, an organic acid, a fatty acid, an organic silane, an organic polysilane, and combinations thereof.

Quaternary ammonium compounds may be given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion. In some embodiments, it is believed (without being limited to any theories) that quaternary ammonium compounds are particularly effective owing to the anchoring effect of the $N^+$ center onto the clay surface.

In some embodiments employing quaternary ammonium compounds, at least one or at least two of $R_1$, $R_2$, $R_3$, and $R_4$ is selected from $C_{10}$-$C_{24}$ chains. In some embodiments, at least one or at least two of $R_1$, $R_2$, $R_3$, and $R_4$ is selected from $C_1$-$C_9$ chains. In some embodiments, at least one or at least two of $R_1$, $R_2$, $R_3$, and $R_4$ is a methyl group. In certain embodiments, two of $R_1$, $R_2$, $R_3$, and $R_4$ are methyl groups and the other two of $R_1$, $R_2$, $R_3$, and $R_4$ are selected from $C_{16}$-$C_{18}$ chains. Generally speaking, the R groups ($R_1$, $R_2$, $R_3$, and $R_4$) can be linear, branched, olefinic, cyclic, aromatic, or functionalized in any way. X may be an organic or inorganic anion. In some embodiments, X is a halide anion such as chlorine or bromine.

Organic acids may include fatty acids, which generally are regarded as having at least four carbon atoms. Any known unsaturated fatty acid, such as oleic acid, or saturated fatty acid, such as stearic acid may be employed. In some embodiments, organic acid may be selected from short-chain acids such as lactic acid, acetic acid, formic acid, citric acid, and oligomers or polymers thereof.

Organic silanes or polysilanes may include any suitable linear or branched silanes with at least one organic group having one to 20 carbon atoms. Silanes are chemical compounds of silicon and another atom such as carbon or hydrogen, which are analogues of alkane hydrocarbons. Silanes consist of a chain of silicon atoms covalently bonded to each other, to carbon, or to hydrogen atoms.

Any suitable clay basic material may be used including kaolin, bentonite, montmorillonite, synthetic layered silicates such as laponites, hectorites, as well as analogous aluminosilicate compositions which would be functionally equivalent. Preferred clay particles comprise clays selected from the Kaolin group of minerals comprising kaolinite, dickite, halloysite, nacrite, montmorrilite, or any other polymorph of $Al_2Si_2O_5(OH)_4$. In certain embodiments, the clay particles are kaolinite.

A preferred range of particle sizes of the base clay is as follows: 40-60% less than 0.2 microns; 70-98% less than 0.5 microns; and substantially all less than 5 microns. In some embodiments, coarser clay particles are utilized, although still less than 5 microns. For example, the range of particle sizes of the base clay may be 5-20% less than 0.2 microns; 10-40% less than 0.5 microns; and substantially all less than 5 microns. "Substantially all" means about 100%, but there can be a few particles present (in a given sample) that are larger than 5 microns, such as due to impurities or random clay particles.

The amount of organic compound may vary. In some embodiments, the treatment includes a quaternary ammonium compound in a concentration of at least about 1 wt %, 2 wt %, 2.5 wt %, 3 wt %. 3.5 wt %, 4 wt %, 5 wt %, or more, of the mass of the clay particles.

A variety of process approaches may be utilized to treat the fine clay particles. In some embodiments, the following process is employed:

1. Pump diluted fine particle clay with water to 20-25% slurry solid into treatment vessel.
2. Heat clay slurry to 65-72° C. and mix moderately continuously.
3. Pump diluted treatment chemical to the heated vessel and allow treatment for 20-40 minutes.
4. Pump treated clay slurry to spray dryer or to a flash dryer.
5. Finished product can be dry ground to produce low-density treated clay with a grinding mill.

When a spray dryer is employed, it will typically contain a set of nozzles to spray treated slurry in micron-sized beads, which are then dried in a heated air chamber. When a flash dryer is employed, it will typically utilize mechanical drying and mixing simultaneously in a heated chamber. Hot air will push dried ground material upward to a cyclone.

The above-described steps are exemplary, and the invention is not limited to these ranges of slurry solids content, or treatment time or temperature. Generally, a quantity of one or more organic compounds will be contacted with suitable fine clay particles, and allowed to react (chemically and/or physically) under effective conditions of time, temperature, pressure, and mixing so that the clay surface is modified to become more hydrophobic.

In some embodiments, only a portion of the organic compounds that are added actually react and bind with the clay particles. In other embodiments, all or substantially all of the organic compounds bind with the clay particles and remain there (i.e., are not removed by any subsequent washing steps).

Some embodiments thus provide a surface-modified hydrophobic clay composition for an ink formulation, comprising:

(i) up to 99 wt % clay particles with a particle-size distribution characterized in that at least 40% of the clay particles are smaller than 0.2 microns, at least 70% of the clay particles are smaller than 0.5 microns, and substantially all of the clay particles are less than 5 microns; and (ii) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

There may be some amount of moisture present in the surface-modified hydrophobic clay composition. For example, the composition may include about 0.5 wt %, 1.0 wt %, 1.5 wt %, 2.0 wt %, or more water.

The surface-modified hydrophobic clay composition may be characterized in a number of ways. In some embodiments, the Fineness of Grind (NPIRI Grinding, ASTM) shows a Scratches value of 0 and a Speckles value less than or equal to 9. The brightness by % Reflectance (TAPPI) may be 84 or higher. Preferably, there is 0.1 wt % or less crystalline silica present.

The surface-modified hydrophobic clay composition may be incorporated into any known ink formulation, in various embodiments. In some embodiments, the surface-modified hydrophobic clay composition is combined with an organic solvent and a resin, along with a pigment and/or dye, to form a heatset ink formulation. It is theorized, without limitation, that the surface-treated clay causes the clay to become more hydrophobic and therefore more easily dispersible in the various ink formulations.

A surface-modified hydrophobic clay composition for an ink formulation comprises, in some embodiments:

(i) up to 99 wt % clay particles with a particle-size distribution characterized in that at least 40% of the clay particles are smaller than 0.2 microns, at least 70% of the clay particles are smaller than 0.5 microns, and substantially all of the clay particles are less than 5 microns; and (ii) from about 1 wt % to about 10 wt %, such as from about 2 wt % to about 8 wt % pr about 2 wt % to about 5 wt %, of one or more organic compounds selected from the group consisting of a quaternary ammonium compound, an organic acid, a fatty acid, an organic silane, an organic polysilane, and combinations thereof.

In some embodiments, a surface-modified hydrophobic clay composition for an ink formulation comprises:

(i) up to 99 wt % clay particles with a particle-size distribution characterized in that at least 40% of the clay particles are smaller than 0.2 microns, at least 70% of the clay particles are smaller than 0.5 microns, and substantially all of the clay particles are less than 5 microns; and (ii) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, the composition includes from about 2 wt % to about 4 wt % of the one or more quaternary ammonium compounds. Some water may also be present, such as up to about 2 wt % $H_2O$.

In some embodiments, at least 50% or at least 60% of the clay particles are smaller than 0.2 microns. In these or other embodiments, at least 80% or at least 95% of the clay particles are smaller than 0.5 microns. In these or still other embodiments, substantially all of the clay particles are less than 2 microns, 3 microns, or 4 microns.

The clay particles preferably include one or more clays selected from the Kaolin group of minerals comprising kaolinite, dickite, halloysite, nacrite, montmorrilite, or any other polymorph of $Al_2Si_2O_5(OH)_4$. The clay particles are kaolin clay particles, in certain embodiments.

At least one (such as one, two, or three) of $R_1$, $R_2$, $R_3$, and $R_4$ is selected from $C_{10}$-$C_{24}$ chains, in some embodiments. At least one (such as one, two, or three) of $R_1$, $R_2$, $R_3$, and $R_4$ is selected from $C_1$-$C_9$ chains, such as methyl (—$CH_3$), in some embodiments. In certain embodiments, two of $R_1$, $R_2$, $R_3$, and $R_4$ are methyl groups and the other two of $R_1$, $R_2$, $R_3$, and $R_4$ are selected from $C_{16}$-$C_{18}$ chains. The monovalent anion X may be organic or inorganic, but is preferably inorganic such as $Cl^-$ or $Br^-$.

Other variations provide a heatset ink formulation comprising:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more organic compounds selected from the group consisting of a quaternary ammonium compound, an organic acid, a fatty acid, an organic silane, an organic polysilane, and combinations thereof.

The resin may be present at about 25-35 wt % or less in the heatset ink formulation. The clay particles may be present at about 5-15 wt % or more in the heatset ink formulation.

Still other variations provide a heatset ink formulation comprising:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

In some embodiments, the resin is present at about 35 wt % or less in the heatset ink formulation, such as about 30 wt %, 25 wt %, or less in the heatset ink formulation.

In some embodiments, the clay particles are present at about 5 wt % or more in the heatset ink formulation, such as about 10 wt %, about 15 wt %, or more in the heatset ink formulation.

Many other variations are possible. For example, a UV-curable ink formulation is provided, comprising:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein X is a monovalent anion.

A UV-curable ink formulation as disclosed may comprise:

(i) a solvent;
(ii) a pigment or dye;
(iii) a resin;
(iv) clay particles with a particle-size distribution characterized in that at least 40% of the clay particles are smaller than 0.2 microns, at least 70% of the clay particles are smaller than 0.5 microns, and substantially all of the clay particles are less than 5 microns; and
(v) from about 1 wt % to about 5 wt % of one or more organic compounds selected from the group consisting of a quaternary ammonium compound, an organic acid, a fatty acid, an organic silane, an organic polysilane, and combinations thereof.

EXAMPLES

Example 1: Influence of Particle Size on Ink Gloss Development

Figure 1:
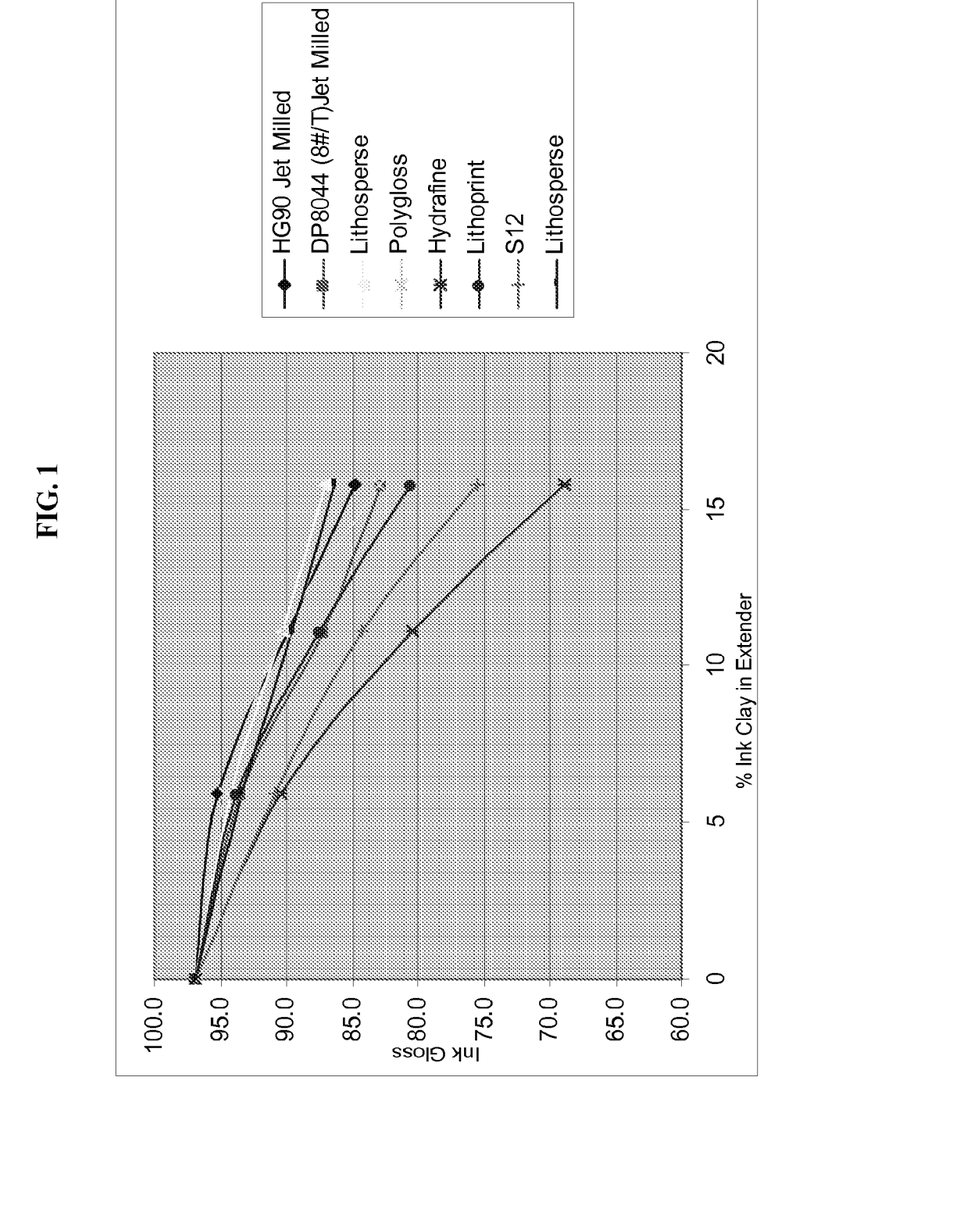
FIG. 1 is a graph depicting the experimental influence of particle size on ink gloss development.

Various ink clay bases are tested for their ability to impart ink gloss in a heatset ink formulation, using the methods disclosed herein. As shown in FIG. 1, finer clay particles lead to better ink gloss. The sample labeled "Lithosperse"

corresponds to the smallest particle size tested, while the sample labeled "Hydrafine" corresponds to the largest particle size tested.

Example 2: Comparison of Two Different Ink Bases and Three Treatment Levels

In this example, treatments using a quaternary ammonium compound as disclosed herein at 2 wt % and 4 wt % loading are compared to a treatment without a quaternary ammonium compound. Also, two different kaolin clay particle types are tested: HG90 and HuberFine ("HF90" in the legend). The particle size of HG90 is 40-60% less than 0.2 microns; 70-98% less than 0.5 microns; and substantially all less than 5 microns. The particle size of HF90 is 5-20% less than 0.2 microns; 10-40% less than 0.5 microns; and substantially all less than 5 microns.

Figure 2:
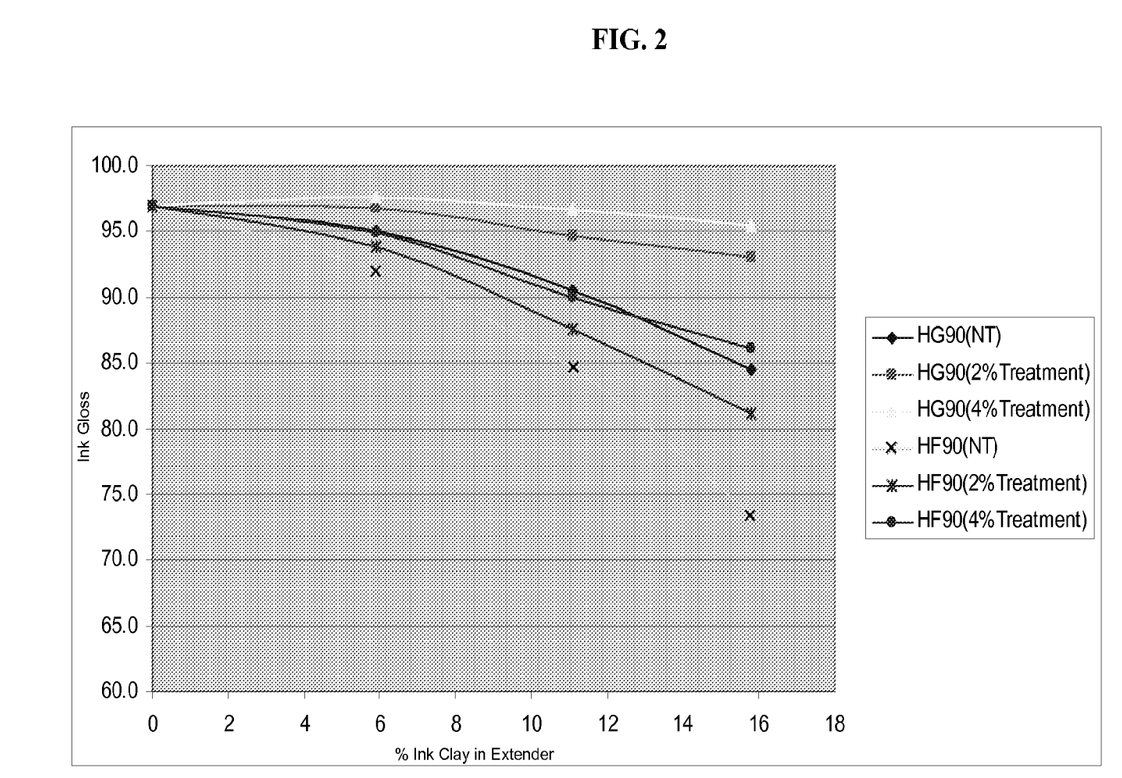
FIG. 2 is a graph depicting the experimental influences of both particle size and treatment level of a quaternary ammonium compound on ink gloss development.

As shown in FIG. 2, ink gloss development of ink clay is primarily associated with its particle size, and secondarily with the concentration of the quaternary ammonium compound used in the treatment.

Example 3: Ink Gloss Development for Pilot-Plant Ink Clay Samples

Jet-milled (dispersed) clay samples are compared against beads (undispersed), using a large spray dryer. It is found that there are no significant differences. The dispersed filter cake contains anionic dispersant which was added after dewatering. The undispersed filter cake contains no added anionic dispersant after dewatering.

Figure 3A:
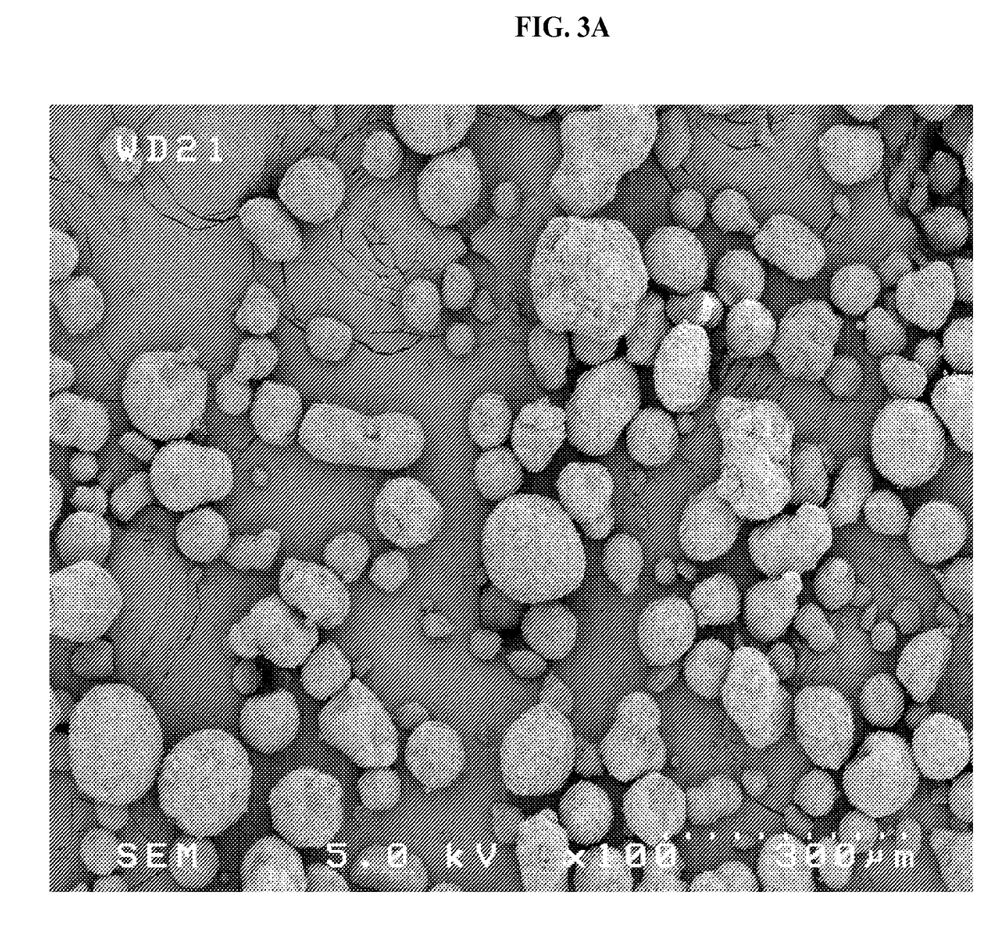
FIG. 3A is an SEM micrograph (100×) of a fine-particle kaolin clay that has not been treated with a quaternary ammonium compound.
Figure 3B:
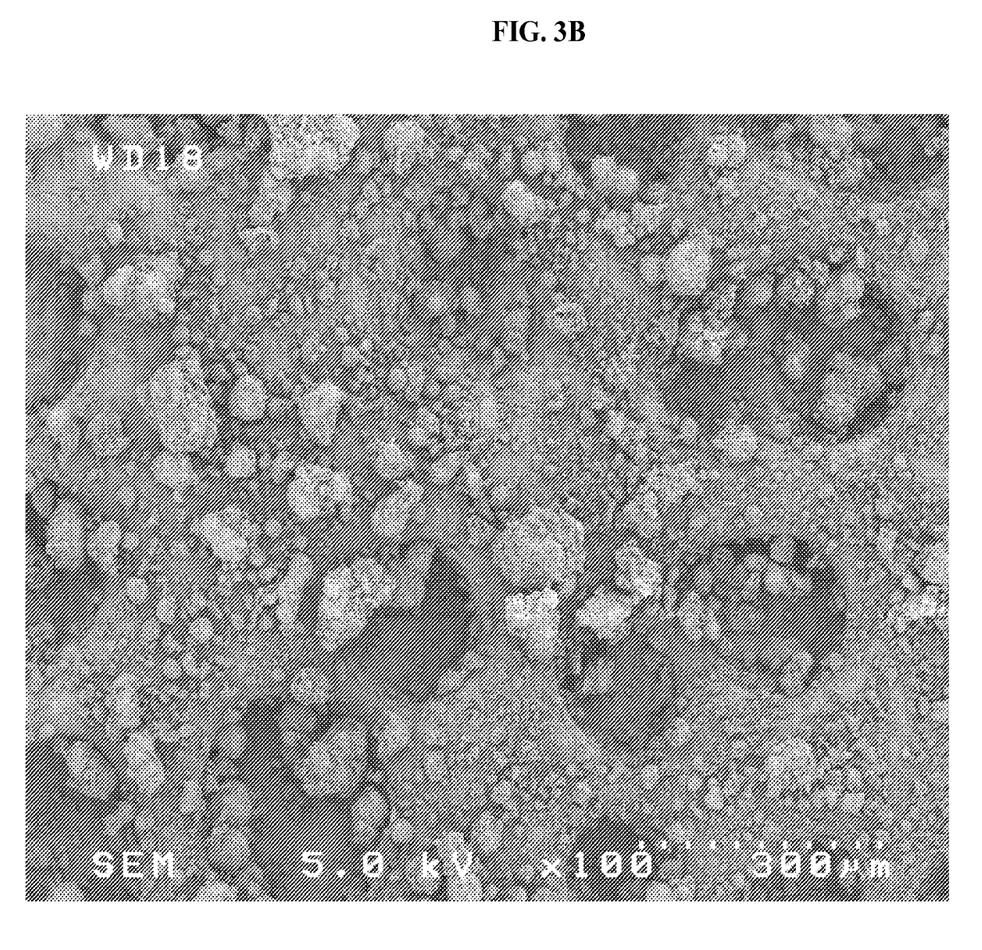
FIG. 3B is an SEM micrograph (100×) of a fine-particle kaolin clay that has been treated with a quaternary ammonium compound, in some embodiments.
Figure 4A:
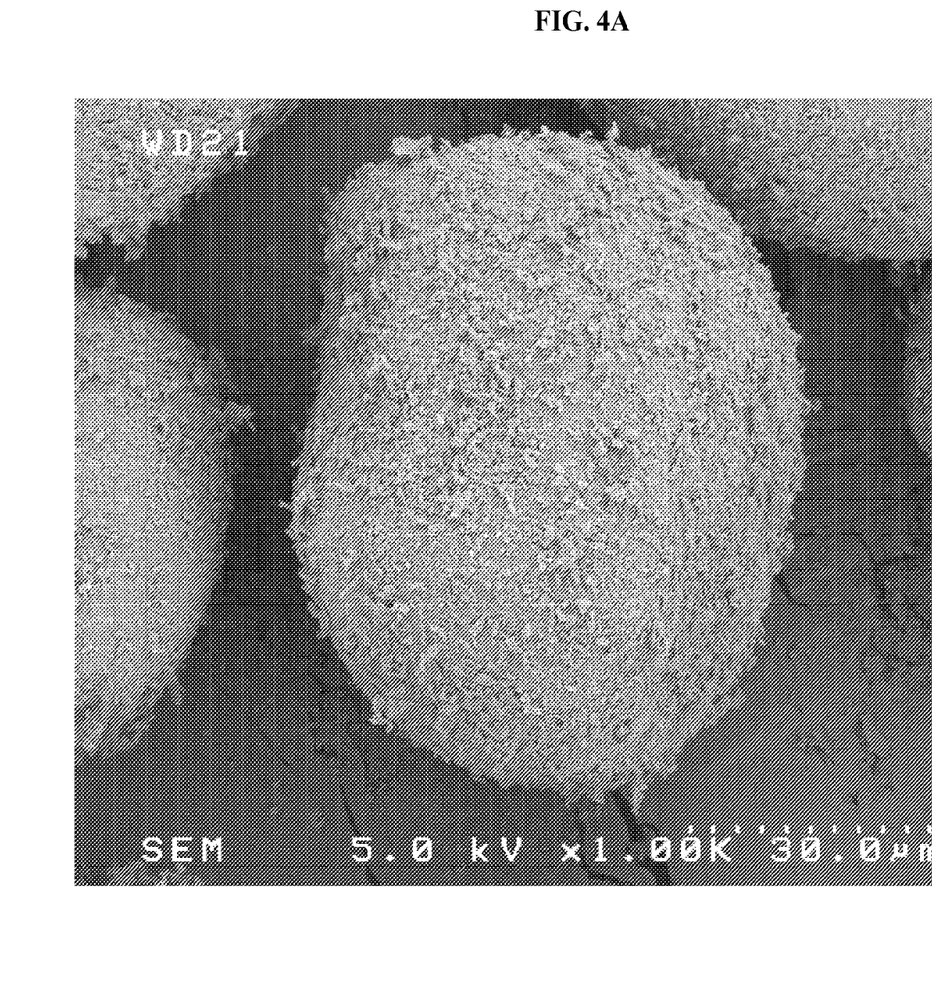
FIG. 4A is an SEM micrograph (1000×) of a fine-particle kaolin clay that has not been treated with a quaternary ammonium compound.
Figure 4B:
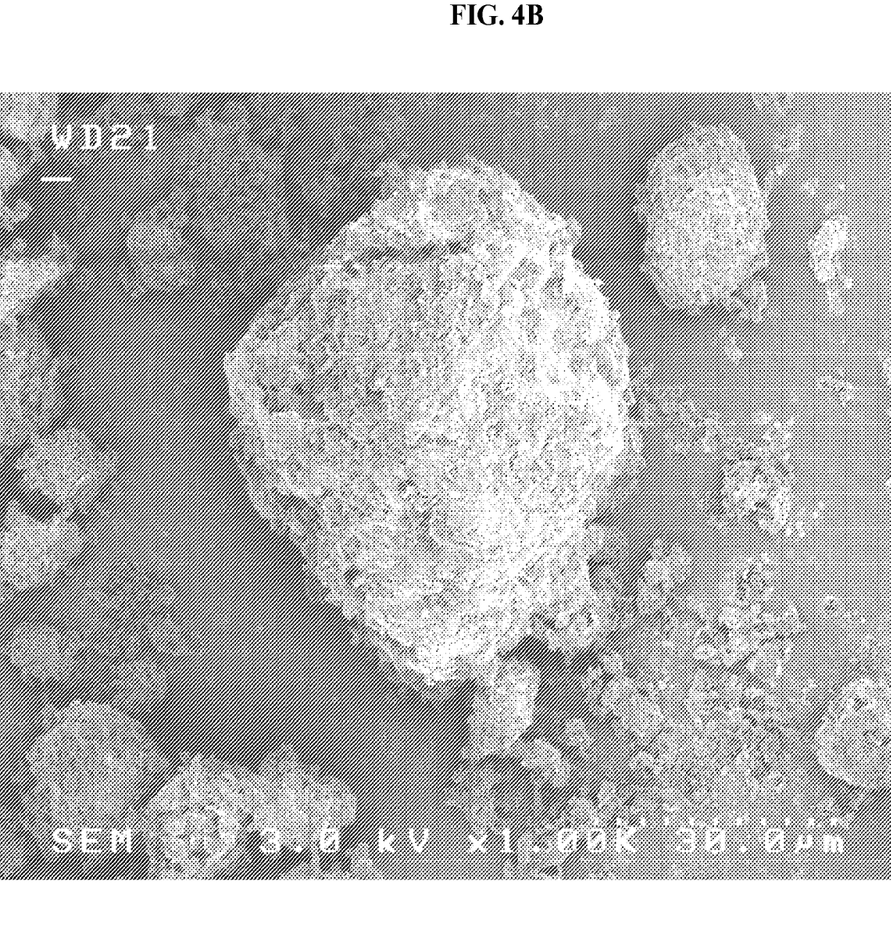
FIG. 4B is an SEM micrograph (1000×) of a fine-particle kaolin clay that has been treated with a quaternary ammonium compound, in some embodiments.

Example 4: Surface Treatment for Maximum Ink Gloss and Resistance to Fountain Solution Bleed A fine-particle kaolin clay is subjected to the disclosed treatment with a quaternary ammonium compound. SEM micrographs of two different spray-dried beads are shown at 100× in FIGS. 3A and 3B. FIG. 3A is an SEM image showing regular spray-dried beads, without treatment. FIG. 3B is an SEM image showing soft-dried beads, with treatment. FIGS. 4A and 4B show the same materials, except at 1000×. The soft spray-dried beads reveal better dispersion. Soft beads are formed due to the coating of fatty acid to the clay surface in the treatment process.

A test procedure for conducting ink clay performance test is the following:
1. Weigh out 75 grams of heatset free flow varnish in a mixing cup.
2. Use lab disperser (cowls blade) to premix the varnish, at a temperature of 20-40° C., at less than 1000 rmp mixing speed.
3. Weigh out a proper amount of treated ink clay and add to varnish.
4. Adjust mixer speed to 4000 rpm; mix 10 minutes.
5. Add mineral solvent for viscosity adjustment.
6. Check for varnish dispersion with NIPRI fineness grind gauge (ASTM ink testing standard).
7. Check bleed with Duke emulsification test (ASTM ink testing standard).

Figure 5:
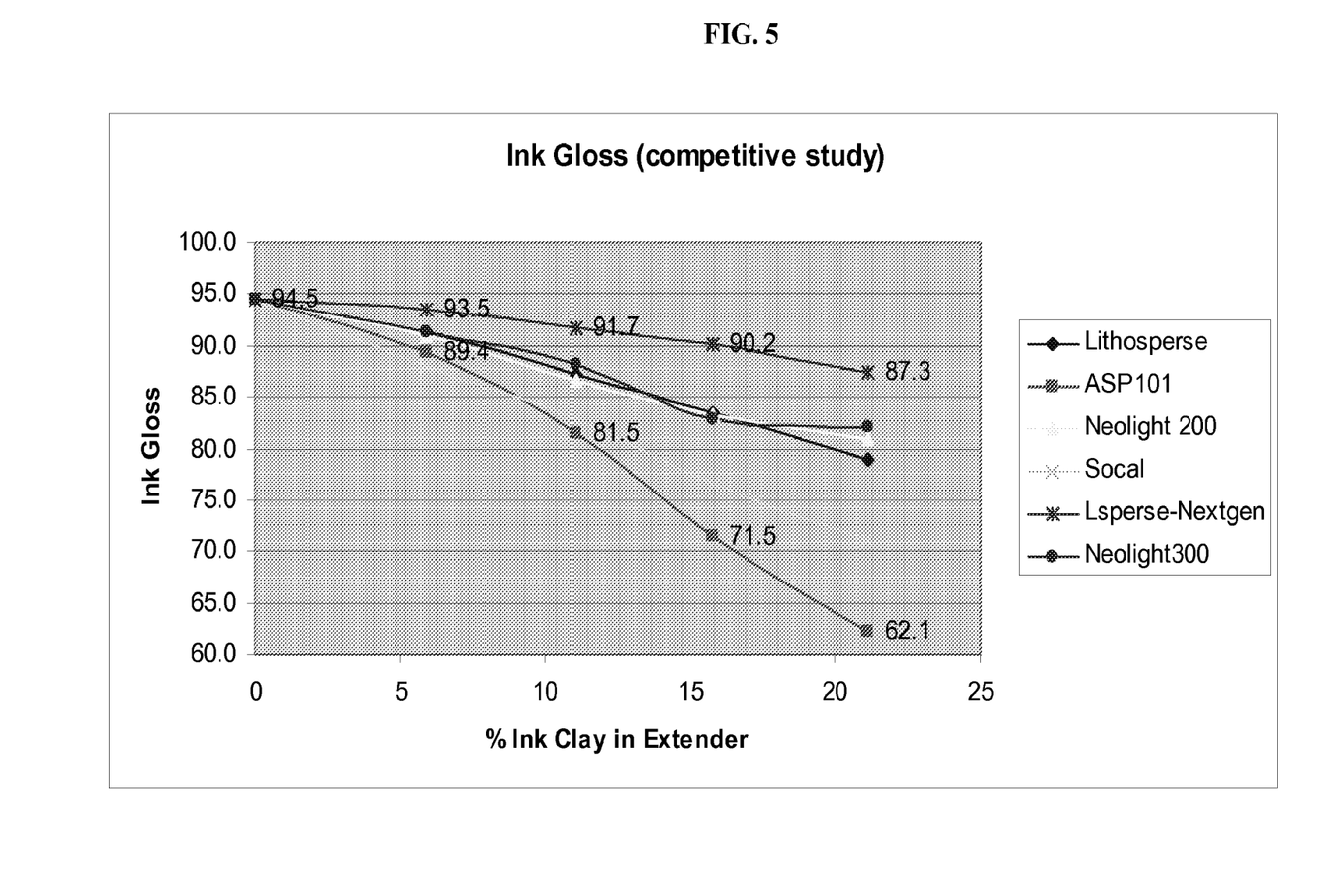
FIG. 5 summarizes experimental ink-gloss data associated with Example 4 of this disclosure.
Figure 6:
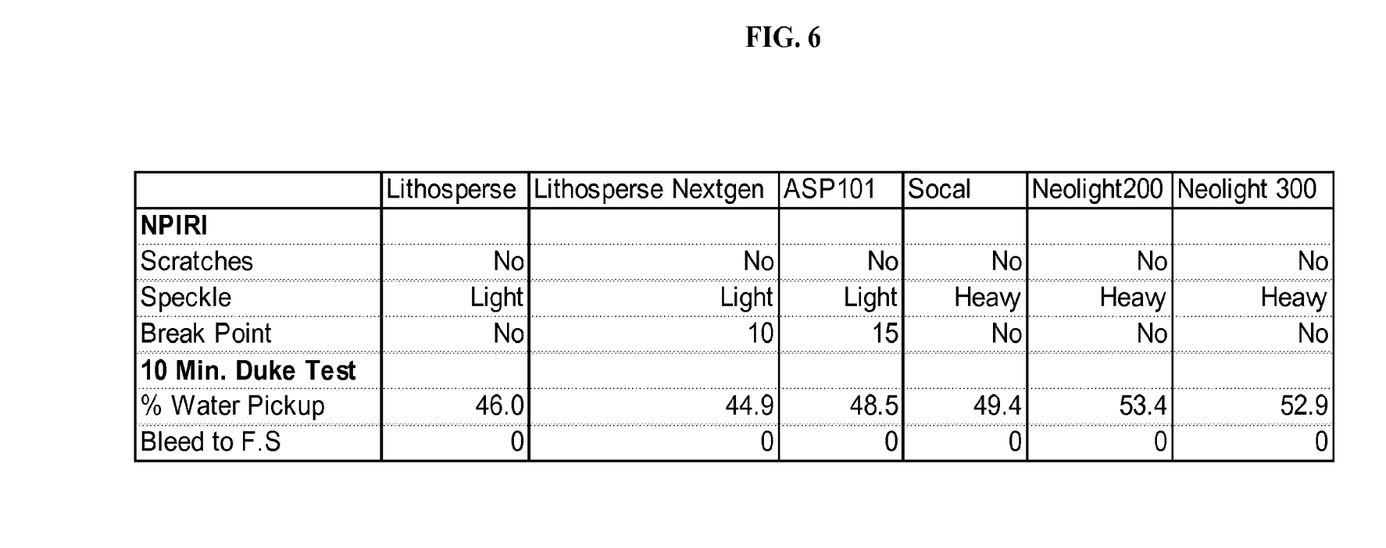
FIG. 6 summarizes additional experimental data associated with Example 4 of this disclosure.

FIG. 5 shows that Lithosperse NextGen ("Lsperse Nextgen" in the legend) shows the highest gloss for a given % ink clay in extender. At 20% ink clay loading, Lithosperse NextGen is 25 points higher than ASP101. At 15% ink clay loading, Lithosperse NextGen is 19 points higher than ASP101. FIG. 6 shows other property data.

This disclosure reveals utility and benefits in several areas, such as improved product performance, lower organic solvent emissions, and overall cost reduction.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent there are variations of the disclosure, which are within the spirit of the disclosure or equivalent to the inventions found in the appended claims, it is the intent that this patent will cover those variations as well. The present invention shall only be limited by what is claimed.

What is claimed is:

1. A surface-modified hydrophobic clay composition for an ink formulation, said composition comprising:
   (i) from more than 0 to 99 wt % of clay particles with a particle-size distribution characterized in that 40% to 60% of said clay particles are smaller than 0.2 microns, 70% to 98% of said clay particles are smaller than 0.5 microns, and substantially all of said clay particles are less than 5 microns; and
   (ii) from about 1 wt % to about 5 wt % of one or more quaternary ammonium compounds given by the formula $[R_1R_2R_3R_4N^+][X^-]$, wherein each of $R_1$, $R_2$, $R_3$, and $R_4$ are independently selected hydrocarbon groups or chains, and wherein $X^-$ is a monovalent anion.

2. The composition of claim 1, wherein at least 50% of said clay particles are smaller than 0.2 microns.

3. The composition of claim 1, wherein said clay particles comprising one or more clays selected from the Kaolin group of minerals comprising kaolinite, dickite, halloysite, nacrite, montmorrilite, or any other polymorph of $Al_2Si_2O_5(OH)_4$.

4. The composition of claim 3, wherein said clay particles are kaolin clay particles.

5. The composition of claim 1, wherein at least one of $R_1$, $R_2$, $R_3$, and $R_4$ is selected from $C_{10}$-$C_{24}$ chains.

6. The composition of claim 5, wherein at least two of $R_1$, $R_2$, $R_3$, and $R_4$ are selected from $C_{10}$-$C_{24}$ chains.

7. The composition of claim 1, wherein at least one of $R_1$, $R_2$, $R_3$, and $R_4$ is selected from $C_1$-$C_9$ chains.

8. The composition of claim 7, wherein at least two of $R_1$, $R_2$, $R_3$, and $R_4$ are selected from $C_1$-$C_9$ chains.

9. The composition of claim 1, wherein at least one of $R_1$, $R_2$, $R_3$, and $R_4$ is a methyl group.

10. The composition of claim 9, wherein at least two of $R_1$, $R_2$, $R_3$, and $R_4$ are methyl groups.

11. The composition of claim 1, wherein two of $R_1$, $R_2$, $R_3$, and $R_4$ are methyl groups and wherein the other two of $R_1$, $R_2$, $R_3$, and $R_4$ are selected from $C_{16}$-$C_{18}$ chains.

12. The composition of claim 1, wherein $X^-$ is an organic anion.

13. The composition of claim 1, wherein $X^-$ is an inorganic anion.

14. The composition of claim 13, wherein $X^-$ is a halide anion.

15. An ink formulation containing a surface-modified hydrophobic clay composition, said composition comprising:
  (i) from more than 0 to 99 wt % of clay particles with a particle-size distribution characterized in that 40% to 60% of said clay particles are smaller than 0.2 microns, 70% to 98% of said clay particles are smaller than 0.5 microns, and substantially all of said clay particles are less than 5 microns; and
  (ii) from about 1 wt % to about 10 wt % of one or more organic compounds selected from the group consisting of a quaternary ammonium compound, an organic acid, a fatty acid, an organic silane, an organic polysilane, and combinations thereof, wherein said ink formulation has an ink gloss of least 90%.

16. The ink formulation of claim 15, wherein said composition comprises from about 2 wt % to about 8 wt % of said one or more organic compounds.

17. The ink formulation of claim 15, wherein at least 50% of said clay particles are smaller than 0.2 microns.

18. The ink formulation of claim 15, wherein said clay particles comprising one or more clays selected from the Kaolin group of minerals comprising kaolinite, dickite, halloysite, nacrite, montmorrilite, or any other polymorph of $Al_2Si_2O_5(OH)_4$.

19. The ink formulation of claim 18, wherein said clay particles are kaolin clay particles.

* * * * *